(12) United States Patent
Fogerlie

(10) Patent No.: US 8,096,439 B2
(45) Date of Patent: Jan. 17, 2012

(54) UNDERGROUND BATTERY CONTAINER SYSTEM

(76) Inventor: Sivert G. Fogerlie, Glendale, AZ (US)

( * ) Notice: Subject to any disclaimer, the term of this patent is extended or adjusted under 35 U.S.C. 154(b) by 1079 days.

(21) Appl. No.: 11/906,338

(22) Filed: Oct. 2, 2007

(65) Prior Publication Data

US 2009/0084704 A1    Apr. 2, 2009

(51) Int. Cl.
  *B65D 88/76* (2006.01)
  *H02G 3/08* (2006.01)
(52) U.S. Cl. .................. 220/484; 220/3.3; 220/567.1
(58) Field of Classification Search .............. 220/484, 220/747, 374, 567.1, 3.3, 3.7, 3.8, 23.91, 220/579; 174/17 R; 206/815; 404/25; 137/371, 137/381; 52/169.6, 169.14
See application file for complete search history.

(56) References Cited

U.S. PATENT DOCUMENTS

| | | | | |
|---|---|---|---|---|
| 2,247,936 A * | 7/1941 | Bishop | ...................... | 174/17 R |
| 2,811,574 A * | 10/1957 | Guerrero | .......................... | 174/57 |
| 3,561,470 A * | 2/1971 | Hawle | .............................. | 137/371 |
| 3,974,599 A * | 8/1976 | Grosh | .............................. | 52/20 |
| 4,491,147 A * | 1/1985 | Argandona | .................. | 137/371 |
| 4,570,812 A * | 2/1986 | Curtis | ............................ | 220/484 |
| 4,655,361 A * | 4/1987 | Clover et al. | ................. | 137/363 |
| 5,058,633 A * | 10/1991 | Sharp | ............................. | 141/86 |
| 6,688,727 B2 * | 2/2004 | Otsuki | ............................ | 347/41 |
| 7,171,994 B1 * | 2/2007 | O'Brien | .................... | 141/311 A |
| 7,513,385 B2 * | 4/2009 | Flynn | ............................. | 220/484 |
| 2005/0145631 A1 * | 7/2005 | Flynn | ............................. | 220/484 |

* cited by examiner

*Primary Examiner* — Bryon Gehman
*Assistant Examiner* — Shawn Braden
(74) *Attorney, Agent, or Firm* — Scott A. Hill; The Hill Law Firm, PLC

(57) ABSTRACT

A rechargeable battery, such as a 12 Volt battery that is recharged by a solar panel, is placed into a container system that includes an enclosure, having a top portion that is open and a bottom portion that is open, that is substantially buried underground. A sleeve, having a bottom portion that is open and a top portion that is closed, is lowered into the enclosure such that air is trapped inside the top portion of the sleeve when water collects against the enclosure. The trapped air prevents flood water from rising high enough to contact terminals of the battery. When flood conditions subside, the water drains out the bottom portion of the container system into the ground. Additionally, a ridge around the bottom of the sleeve makes it easier to insert the sleeve into the enclosure because the ridge slides over the dirt and debris, but the ridge scrapes and removes unwanted dirt and debris from the enclosure whenever the sleeve is removed to access the battery. A battery platform may be used to raise a battery higher into the sleeve. The entire container system can be completely buried underground, but access to a battery in the container only requires that the dirt covering the top most part of container be removed, and then the sleeve is simply lifted out of the enclosure without having to dig around the enclosure.

8 Claims, 3 Drawing Sheets

UNDERGROUND BATTERY CONTAINER SYSTEM

BACKGROUND OF THE INVENTION

Solar panels are increasingly being used to generate power for closed electrical systems, so there is an increased need to protect batteries that store this power. A battery provides a longer life if it is insulated from daily weather changes and protected against theft and vandalism. A commonly suggested way to insulate and protect a 12 volt storage battery is to bury it in the ground. (See U.S. Pat. Nos. 6,422,714, 6,621, 181 and 7,075,427.) Although there are some excellent battery vaults available, such as those shown and described in U.S. Pat. Nos. 6,016,828, 6,304,444, 6,356,434, 6,617,973 and 6,772,566, the cost and size of these devices are too large to justify installing one for a simple light. Battery vaults are best suited for large applications, such as back up power for communications systems. For smaller applications, such as supplying power to a pole mounted light in a remote area, most people can only justify purchasing a simple battery container comprising a plastic box with a lid. Holes are cut in the container to run wires, and it is common that a liberal application of duct tape wraps up the assembly before it is buried in a hole. Some of the problems encountered when burying a battery are water, dirt and poor access for maintenance. If the lid is on top, it must include a good water seal or the container will eventually fill with water until the battery terminals short to each other. If the lid is on the bottom, the entire container must be dug out of the ground to access the battery. Neither system is very well suited to any application that requires maintenance.

A solar panel has a useful life that is several times longer than a typical battery, so even a trouble-free system will require at least a couple of battery changes. Accessing an underground battery usually involves a considerable amount of digging because most battery containers must be completely removed to access the battery. Digging around a battery container always includes the risk of damaging underground wires, and the extra care required to avoid damaging power cables can be more difficult and time consuming than the original installation of an underground battery. There is an increasing and clear need for an easy access, simple and affordable underground battery container that is well suited for smaller applications where flooding is a concern.

SUMMARY OF THE INVENTION

The present invention is a container system for a battery that is buried underground. The container system comprises an outer enclosure that accepts an inner sleeve. The sleeve includes a cover such that air can become trapped in at least the top portion of the sleeve, similar to a bell jar. In flood conditions, rising water will begin to fill the sleeve from the bottom up, but as the trapped air is pressurized by the rising water, the water level is prevented from rising high enough to contact the terminals of a battery placed inside the sleeve. When the flood conditions subside, the water will be absorbed by the ground. Additionally, because the trapped air is normally in contact with soil at the bottom of the sleeve, there is a gas exchange that can alleviate excess hydrogen build-up from the battery. A battery platform of the preferred embodiment raises the battery higher into the sleeve for added protection.

An added benefit of the preferred embodiment of the present invention is the use of a ridge positioned around the bottom portion of the sleeve. Excess dirt piled against the bottom of the inside wall of the enclosure can prevent a sleeve from sliding all the way into the enclosure, and this excess dirt is the most difficult to remove because it tends to pack against the enclosure during attempts to remove it by hand. The ridge simplifies a maintenance procedure because accumulated dirt and debris deposited against the inside of the enclosure is scraped away and lifted out of the enclosure every time the sleeve is removed. The scraped outer enclosure is ready to accept the inner sleeve without additional preparation. Furthermore, the ridge is designed to slide over the top of any remaining dirt or debris when the sleeve is inserted into the enclosure, additionally reducing the amount of dirt that falls into the enclosure. With this improved ridge design, one only needs to dig down to the cover of the sleeve in order to access an underground battery kept in the container system. The system is effectively self-cleaning. With the inner sleeve removed, the contents of the container system are very accessible. Once a maintenance action is performed, the inner sleeve is simply dropped back into the outer enclosure and then covered with dirt. Buried power cables are not disturbed during a maintenance action.

Figure 1:
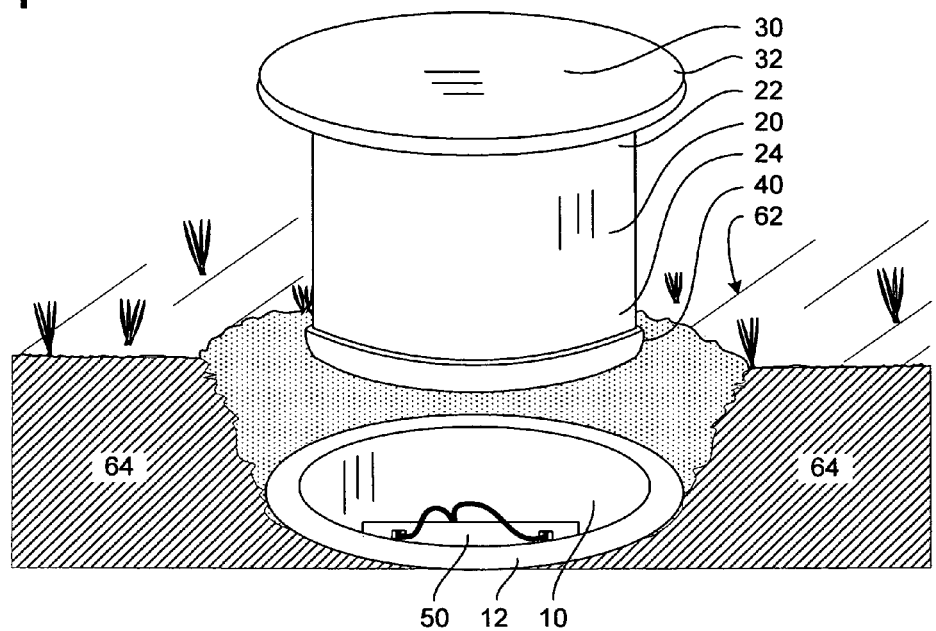
FIG. 1 is a perspective view of a battery container system of the present invention with the sleeve lifted out of the enclosure.

The following is the list of numerical callouts used in FIGS. 1-5:

2 battery container system
10 enclosure
12 top portion
14 bottom portion
16 foot
18 anchor
20 sleeve
22 top portion
24 bottom portion
26 trapped air
28 water
30 cover
32 overlapping portion
34 handle
36 fastener
40 ridge
42 edge
44 channel
46 dirt and debris
50 rechargeable battery
52 battery platform
54 vent hole
55 elongated slot
56 removable support
57 support hole
58 charge controller
60 mounting bracket
62 ground
64 earth

DETAILED DESCRIPTION OF THE INVENTION

This detailed description will begin by describing a battery container system of the present invention that includes an enclosure, a sleeve, a cover and a rechargeable battery. Following will be a description of a bottom portion of the sleeve including the preferred ridge, which is characterized by an edge and a channel for scraping and collecting dirt and debris away form the inside of the enclosure. Finally, there will be a description of how to incorporate battery platforms and electronics into the battery container system.

The enclosure is a simple structure having closed sturdy walls that are substantially vertical. As seen in FIGS. 1-5, a battery container system 2 preferably has an enclosure 10 that is cylindrical in shape, having a top portion 12 and a bottom portion 14, with a substantially uniform horizontal plane cross-section throughout. The preferred material is any of the various thermoplastic plastics, such as 0.08 inch (2 mm) thick polypropylene or polyvinyl chloride. For example, a 15 to 20 inch (half meter) length of 15 inch (0.4 meter) PVC circular storm sewer pipe will work well for holding most types of 50 to 100 amp hour sealed rechargeable 12 volt batteries. The enclosure can simply be a rectangular sheet of plastic that is rolled back onto itself to form a tube. Other enclosure shapes, such as a rectangular horizontal cross section, will work, but strength is sacrificed. The most preferred enclosure will be a molded plastic tube with a foot 16, similar to the enclosures of FIGS. 1-5. The foot is used to anchor the enclosure into the earth 64 or against the ground 62. Because there are locations where it is impractical to dig a hole, anchors 18 can be installed through the foot to secure the enclosure to the ground, which is especially useful over rocky ground or concrete.

To install an enclosure 10, the preferred method is to dig a hole in the earth to a depth that is a few inches (tenth of a meter) deeper than the height of an enclosure. If storm sewer pipe is used, the height of the enclosure will be the length of the section of pipe used. Ribbed pipe, such as Ultra-Rib™ PVC storm sewer pipe available through PWEagle Inc., Eugene, Oreg., is preferred because it will not easily slide out of the hole after dirt is packed against the outside of the enclosure. Any necessary trenches for wires or cables, such as wires that provide power to a light or other electrical device, and wires that run from a solar panel to charge the battery in the battery container system, should also be dug to the hole in the earth. The bottom of the hole may be covered with filter fabric, but this is optional. The enclosure is then lowered into the hole such that the length of pipe is vertical. Any wires or cables of the system should now be inside the enclosure, preferably coming up through the bottom portion 14 of the enclosure. The bottom portion of the enclosure is preferably level and open to the earth 64. The term "open" means that at least air and water can pass through the structure. The top portion 12 is also preferably level and open.

Figure 2:
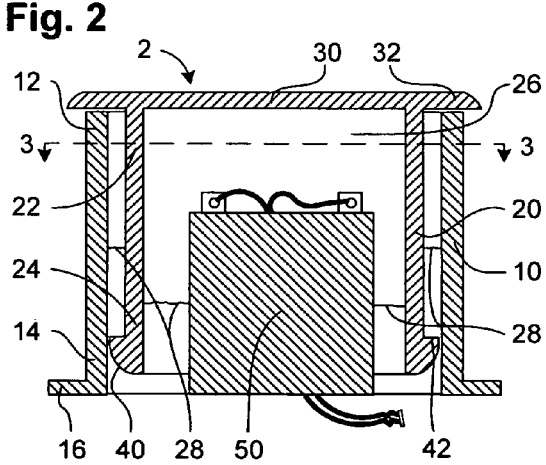
FIG. 2 is a cross section view through a vertical plane of an assembled battery container system of FIG. 1.
Figure 3:
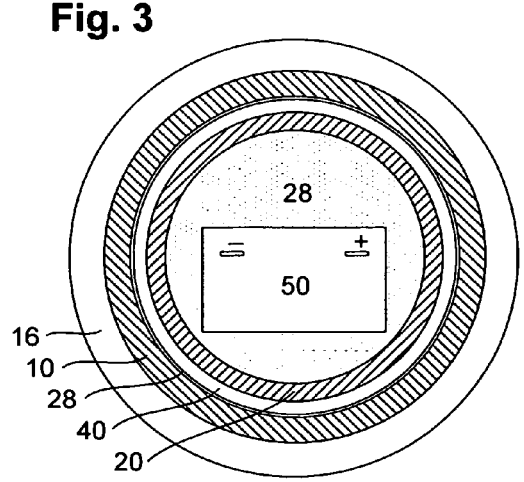
FIG. 3 is a cross section view through line 3-3 of FIG. 2.

The sleeve 20, which is shaped to easily drop inside the enclosure 10, has a top portion 22 and a bottom portion 24. The sleeve must be made from a substantially non-porous material, most preferably a thermoplastic plastic. The sleeve shown in FIGS. 1-3 is molded plastic. The top portion of a sleeve is closed and the bottom portion of a sleeve is open, so the sleeve is capable of trapping a lot of air inside the top portion. The term "closed" means that air and water cannot pass through the structure. FIG. 2 shows how rising water 28 pressurizes the trapped air 26 inside the sleeve until equilibrium is reached and the water level stops rising inside the sleeve. Because the primary purpose of the sleeve is to create the pocket of trapped air, the thickness of material used to make the sleeve does not need to be as thick as the enclosure material. If the sleeve is thermoformed, the diameters of horizontal cross sections of the sleeve should be smaller near the top portion to reduce the likelihood of thin or weak areas being formed. The outside diameter of the sleeve should be small enough to easily slide through the inside diameter of the enclosure. The clearance between the enclosure and the sleeve is preferably at least a quarter inch (6 mm), but a larger clearance makes it easier to remove the sleeve.

A cover 30 is formed or secured over the top portion 22' of the sleeve 20. The preferred cover has a perimeter that at least extends to cover the top portion 12 of the enclosure 10. A cover that is larger than the top of the enclosure will have an overlapping portion 32 that can be used to easily grasp the cover for removal. The cover needs to be strong enough to support the weight of a person when the cover is over the top of the enclosure. If the sleeve is molded plastic, the cover will preferably be part of that mold, as it is in FIGS. 1 and 2, so the cover is not a separate piece part. If the cover is a separate piece part, as it is in FIGS. 4 and 5, then the cover can be adhered, welded or otherwise fastened to the sleeve in such a way that the ability of the sleeve to trap air is not compromised. A thermoformed sleeve should have a cover that is a separate piece part that is fastened to the top portion of the sleeve, so the cover can be stronger and thicker than the sleeve. Optionally, as seen in FIG. 5, a handle 34 may be added to the cover to make it easier to remove the cover and sleeve from a deep hole. For added security, a cover may be secured to an enclosure using fasteners 36, as seen in FIG. 4.

A ridge 40 is formed or secured around the bottom portion 24 of the sleeve 20, close to where it is open. The ridge can be molded, as seen in FIGS. 1 and 2, or thermoformed, as seen in FIGS. 4 and 5. The ridge could also be a separate piece part that is secured around the bottom portion of the sleeve. The ridge extends upwardly and away from the sleeve at a slight angle such that the ridge easily slides down and into the enclosure. The outer most portion of the ridge, farthest from the sleeve, is characterized by an edge 42 that scrapes against the enclosure when the sleeve is pulled out of the enclosure. The ridge can be continuous or broken, but it should substantially surround the bottom portion of the sleeve even if it is broken. The angle between the edge and the sleeve can be obtuse (FIG. 2), or the angle can be acute (FIGS. 4 and 5). An acute angle creates a channel 44 for collecting dirt and debris 46 that is scraped away by the edge. The channel additionally allows the edge to flex toward the sleeve, which may reduce the effort required to remove a sleeve from an enclosure, especially if there is a lot of dirt and debris lodged against the side of the enclosure.

Figure 4:
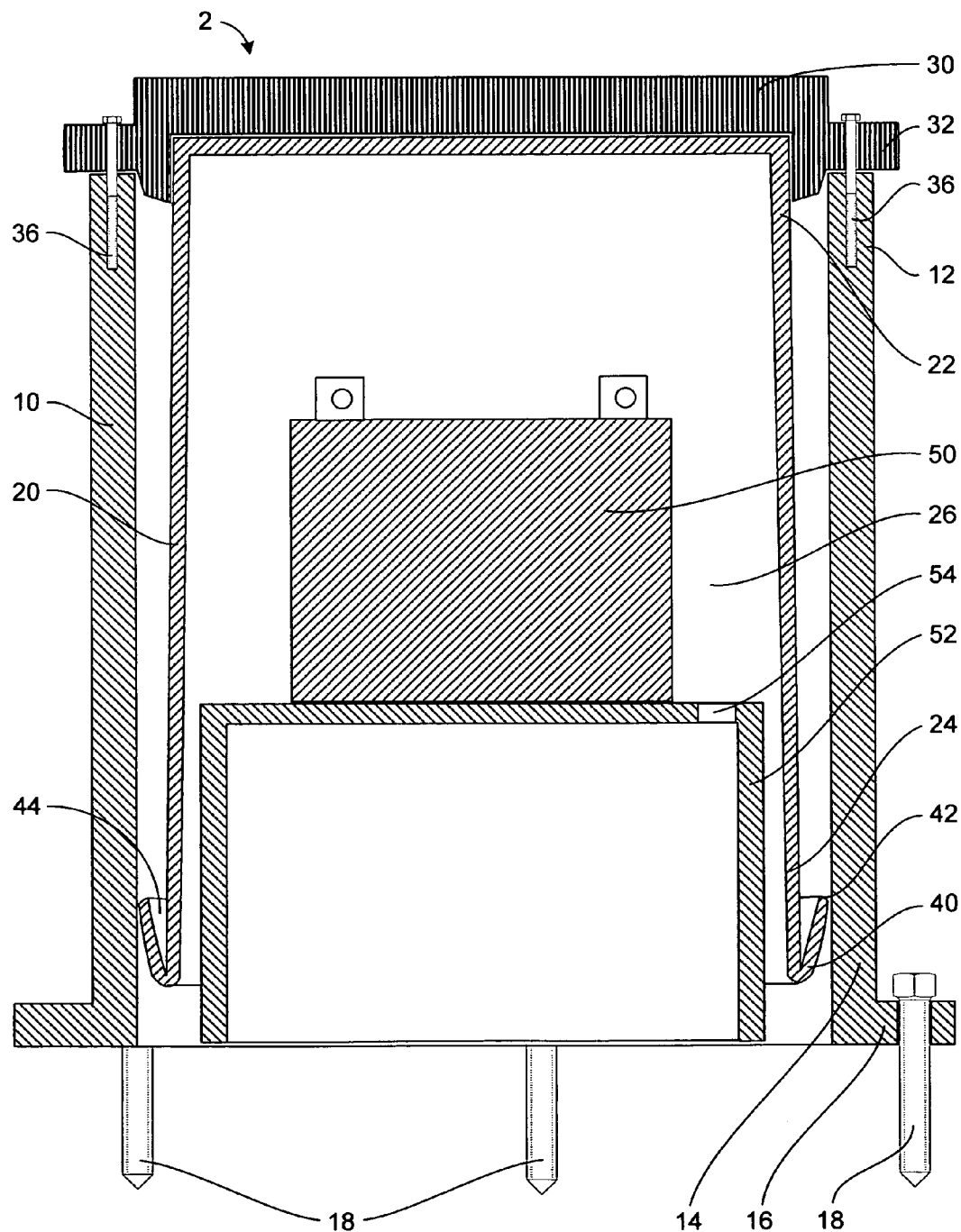
FIG. 4 is a cross section through a vertical plane of a preferred embodiment of the present invention adapted for use on the ground.
Figure 5:
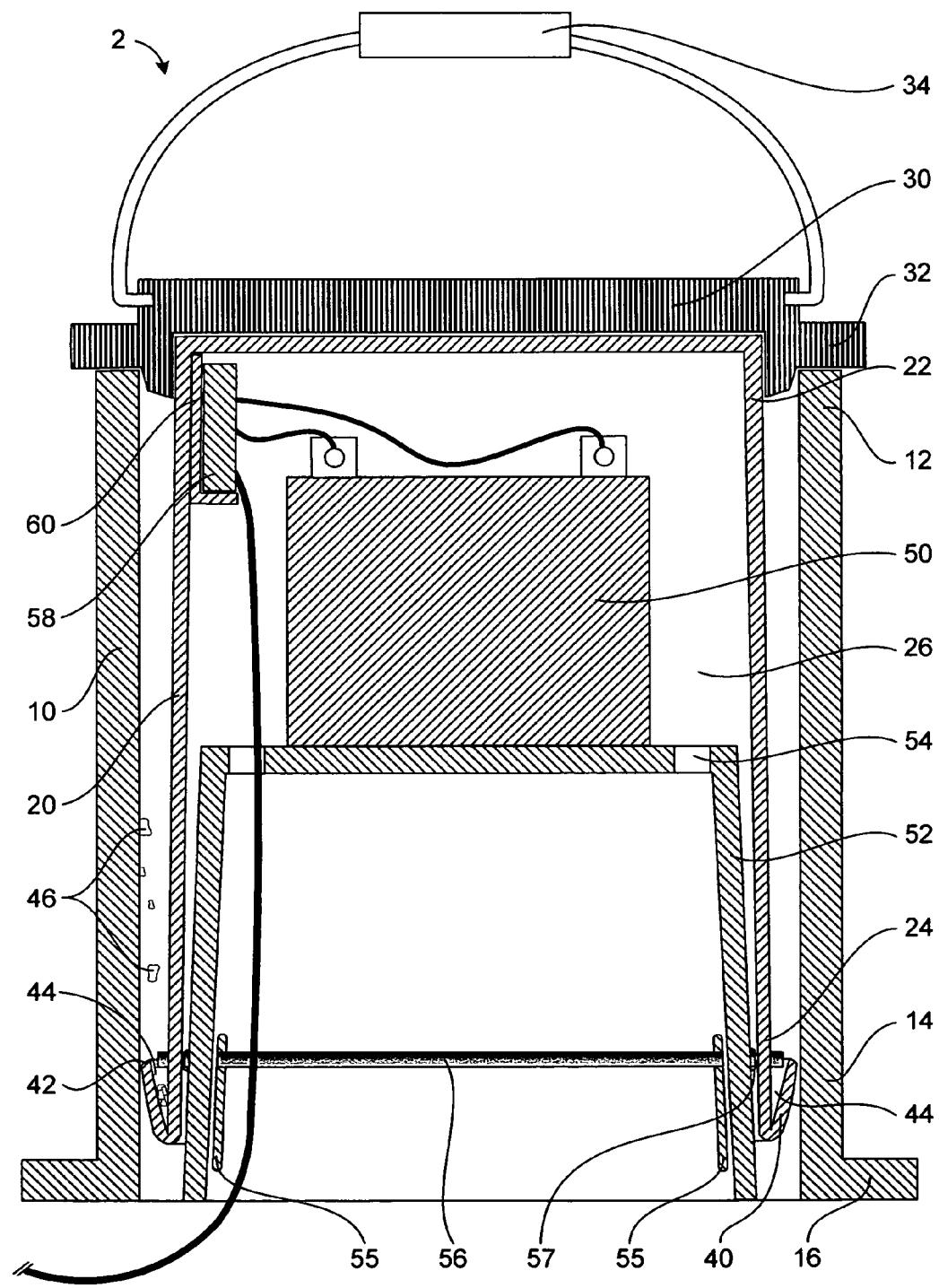
FIG. 5 is a cross section through a vertical plane of a preferred embodiment of the present invention adapted for use underground, especially for more deeply buried container systems.

A battery platform 52, such as the one shown in FIG. 4, can optionally be placed inside the enclosure to raise the rechargeable battery 50 farther into the trapped air 26, especially into the top portion 22 of the sleeve 20 that is most protected against flooding. The battery platform preferably includes at least one vent hole 54 on or near a top part of the sleeve to maximize the volume of air that can be trapped inside the sleeve. The battery platform does not need to have a bottom side as the bottom of the walls of the platform can rest directly against the earth. Obviously, the battery platform needs to be smaller than the sleeve and strong enough to support a battery.

A removable support 56, such as the one shown in FIG. 5, can optionally be used to connect a battery platform 52 to the sleeve 20 for easier installation and removal of a rechargeable battery 50. The removable support is most preferably one or more rods that pass through support holes 57 in the bottom portion 24 of the sleeve at or near the ridge 40, and through elongated slots 55 in the battery platform. When the cover 30 of the battery enclosure system shown in FIG. 5 is removed by lifting the handle 34 away from the enclosure 10, the sleeve is lifted by the removable support. As the sleeve is lifted, the removable support catches on the top of the elongated slots such that the battery platform is also lifted by the removable support, along with the rechargeable battery. While the sleeve is in the enclosure, the walls of the enclosure prevent the removable support from sliding out of the sleeve. Once the sleeve is removed from the enclosure and placed on the ground, the removable support moves toward the bottom of the elongated slots such that the removable support can easily be pulled out through the side of the sleeve. If the removable support is partially held in position by the ridge, as in FIG. 5, the removable support can be removed a couple of ways. A first way is to outwardly deform the bottom portion of the sleeve such that the removable support becomes too short to span the diameter of the deformed portion of the now oval bottom portion of the sleeve. A second way is to fold the ridge down where the rod is sticking through the sleeve such that the rod can be pulled over the top of the edge of the ridge. Obviously, the ridge in FIG. 5 is trapping the ends of the rod when the sleeve is inside the enclosure. As an alternative to rods, the removable support could just be fasteners, such as screws, that pass through the sleeve and into the battery platform. As yet another alternative to rods, the removable support could be a set of hooks or straps that extend from the bottom of the battery platform and hook over the edge of the ridge, such that the open end of each hook is lodged in the channel.

An additional feature of the battery container system shown in FIG. 5 is a charge controller 58 that is secured to the inside of the sleeve 20 using a mounting bracket 60. The charge controller has wires extending from it to the battery and to electronics outside the trapped air in the sleeve. The outside electronics typically include a solar panel and a light fixture. Other electronics can be mounted inside the sleeve in the same manner as the charge controller, or electronics can simply be glued or laid over the top of the battery, especially if a plastic tray is used.

While a preferred form of the invention has been shown and described, it will be realized that alterations and modifications may be made thereto without departing from the scope of the following claims. For example: a length of concrete storm sewer pipe will also work as the enclosure; the rechargeable battery can be any size or voltage needed for a particular application; more than one rechargeable battery can be placed inside of one battery container system, such as two 12 volt batteries connected in series for a 24 volt application; the battery platform can just be a concrete block or other similar object; and the walls of the sleeve can be flexible.

What is claimed is:

1. A battery container system comprising:
   an enclosure, having a top portion that is open and a bottom portion that is open, that is at least half buried underground, and the bottom portion open to the ground;
   a sleeve, having a bottom portion that is open and a top portion that is closed, that fits at least mostly inside the enclosure;
   a battery platform that is positioned at least partially inside the sleeve;
   wherein air trapped inside the top portion of the sleeve when water collects against the enclosure; and
   wherein the battery platform at least partially rests directly against the ground.

2. The battery container system of claim 1 wherein the enclosure is cylindrical.

3. The battery container system of claim 1 characterized by a cover that is a separate part that is secured to the top portion of the sleeve.

4. The battery container system of claim 3 further comprising a handle attached to the cover.

5. The battery container system of claim 1 characterized by a cover, secured over the top portion of the sleeve, that is broad enough to completely cover the top portion of the sleeve and at least partially overlap the top portion of the enclosure such that an overlapping portion of the cover can be grasped to lift the sleeve out of the enclosure.

6. The battery container system of claim 1 wherein the battery platform is characterized by at least one vent hole.

7. The battery container system of claim 1 further comprising a ridge adjacent, and surrounding at least half the distance around, the bottom portion of the sleeve; the ridge being useful for scraping and removing excess dirt and debris that collects against the inside of the enclosure; and
   wherein the ridge is upturned, such that there is an edge that slides over dirt and debris when the sleeve is inserted into the enclosure, but the edge scrapes and lifts dirt and debris when the sleeve is removed from the enclosure.

8. The battery container system of claim 7 wherein the ridge is further characterized by a channel that lies between the edge and the sleeve, the channel being capable of collecting the dirt and debris that is scraped away from the enclosure by the edge.

* * * * *